US006187875B1

(12) United States Patent
Bergmans et al.

(10) Patent No.: US 6,187,875 B1
(45) Date of Patent: Feb. 13, 2001

(54) ACID FUNCTIONAL POLYESTER RESINS AND LOWER TEMPERATURE CURABLE POWDER COATING COMPOSITIONS COMPRISING THEM

(75) Inventors: Ann Elise Germaine Christiane Bergmans; Jean-Marc Jacques Eric Bertens, both of Ottignies Louvain-la-Neuve (BE); Petrus Gerardus Kooijmans, Amsterdam (NL); Marc Jozef Rans; Christian Jean Charles De Cock, both of Ottignies Louvain-la-Neuve (BE)

(73) Assignee: Shell Oil Company, Houston, TX (US)

(*) Notice: Under 35 U.S.C. 154(b), the term of this patent shall be extended for 0 days.

(21) Appl. No.: 09/421,168

(22) Filed: Oct. 19, 1999

Related U.S. Application Data

(63) Continuation-in-part of application No. 09/060,721, filed on Apr. 15, 1998, now abandoned, and a continuation-in-part of application No. 09/048,037, filed on Mar. 25, 1998, now abandoned.

(30) Foreign Application Priority Data

| Mar. 25, 1997 | (EP) | 97200894 |
| Apr. 9, 1997 | (EP) | 97201056 |
| Apr. 18, 1997 | (EP) | 97201150 |
| Nov. 30, 1998 | (EP) | 98204030 |

(51) Int. Cl.$^7$ .................................................. C08F 20/00
(52) U.S. Cl. ................. 525/438; 528/271; 528/272; 528/297; 528/300; 528/302; 528/307; 528/308; 528/361; 525/437
(58) Field of Search ...................... 528/271, 272, 528/297, 300, 302, 307, 308, 361; 525/437, 438

(56) References Cited

U.S. PATENT DOCUMENTS

| 3,404,018 | 10/1968 | Hicks | 106/252 |
| 3,491,066 | 1/1970 | Petropoulos | 260/75 |
| 3,576,903 | 4/1971 | Groff | 260/824 |
| 3,651,098 | 3/1972 | Heer et al. | 260/348 |
| 3,749,758 | 7/1973 | Gannon | 260/835 |
| 4,091,001 | 5/1978 | Berger | 260/75 EP |
| 4,094,721 | 6/1978 | Sturm et al. | 156/309 |
| 4,097,466 | 6/1978 | Berger | 260/75 EP |
| 4,233,202 | 11/1980 | Berger et al. | 260/348.36 |
| 4,997,907 | 3/1991 | Marten et al. | 528/272 |
| 5,138,078 | 8/1992 | Brytus | 549/557 |
| 5,212,213 | 5/1993 | Hutter | 522/81 |
| 5,262,510 | 11/1993 | Kwon et al. | 528/112 |
| 5,480,960 | 1/1996 | Freriks et al. | 528/198 |
| 5,484,842 | 1/1996 | Lewarchik et al. | 524/608 |
| 5,576,397 | 11/1996 | Oberressl et al. | 525/444 |
| 5,739,213 | 4/1998 | Freriks et al. | |
| 5,811,198 | 9/1998 | Freriks et al. | 428/482 |

FOREIGN PATENT DOCUMENTS

| 1030824 | 11/1958 | (DE) . |
| 1669725 | 6/1971 | (DE) . |
| 0136263 A2 | 8/1984 | (EP) . |
| 0365428 A2 | 4/1990 | (EP) . |
| 0447360 A2 | 9/1991 | (EP) . |
| 0538931 A2 | 10/1992 | (EP) . |
| 0612779 A2 | 8/1994 | (EP) . |
| 0634434 A2 | 1/1995 | (EP) . |
| 0720997 A2 | 7/1996 | (EP) . |
| 1048893 | 11/1966 | (GB) . |
| 49-128089 | 12/1974 | (JP) . |
| 52-003700 | 1/1977 | (JP) . |
| 58-189261 | 11/1983 | (JP) . |
| 60-088079 | 5/1985 | (JP) . |
| WO 91/14745 | 10/1991 | (WO) . |
| WO 94/04589 | 3/1994 | (WO) . |
| WO 95/25762 | 9/1995 | (WO) . |
| WO 98/24828 | 6/1998 | (WO) . |

OTHER PUBLICATIONS

U.S. application No. 08/601,915, Freriks et al., filed Feb. 15, 1996.
U.S. application No. 09/024,756, Freriks et al., filed Feb. 17, 1998.
"Epoxy Resins, Chemistry and Technology" edited by Clayton A. May, Copyright © 1988 by Marcel Dekker, Inc., 270 Madison Avenue, New York, New York 10016, pp. 758–760.
Chemical Abstracts, vol. 83, No. 2, 14–7–75, Columbus, Ohio, U.S., Abstract No. 11413, XP002031676.
European Search Report of May 4, 1999.

*Primary Examiner*—Samuel A. Acquah

(57) ABSTRACT

Linear, carboxylic acid functional polyester resins produced by reaction of:

(a) at least one aromatic and/or cycloaliphatic dicarboxylic acid compound A, comprising two aromatic and/or secondary aliphatic carboxyl groups in the 1,2-position, or anhydride thereof;

(b) at least one hydroxyl monocarboxylic acid $B_1$, comprising two aliphatic hydroxyl groups, which groups each independently may be primary or secondary hydroxyl groups and wherein the carboxylic acid group is a tertiary carboxyl group, mixed with a cycloaliphatic diol $B_2$ in an amount of at least 5 wt %, relative to the weight of $B_1$ and $B_2$ together;

(c) optionally an aliphatic dicarboxylic acid C, comprising an alkylene group having from 3 to 8 carbon atoms and having two terminal aliphatic carboxyl groups; and (d) optionally an aromatic monocarboxylic acid D, the molar ratio of the compounds $A:B_1+B_2:C:D$ being $X:Y+X+Z_1:Y:Z_2$, wherein X ranges from 1 to 8, Y ranges from 0 to 8, $Z_1$ ranges from -3 to 3 and $Z_2$ ranges from 0 to 2, until essentially all the hydroxyl groups as initially present in the reaction mixture have been reacted, and powder coating compositions containing an epoxy resin and said linear, carboxylic acid functional polyester resin, and a process for their preparation.

18 Claims, No Drawings

US 6,187,875 B1

ACID FUNCTIONAL POLYESTER RESINS AND LOWER TEMPERATURE CURABLE POWDER COATING COMPOSITIONS COMPRISING THEM

This is a continuation-in-part of application Ser. No. 09/060,721 filed Apr. 15, 1998, ABN and application Ser. No. 09/048,037 filed Mar. 25, 1998, ABN the entire disclosure of which is hereby incorporated by reference.

The present invention relates to carboxyl functional polyester resins, to powder coating compositions comprising them, to cured coating compositions and to a process for their preparation.

Powder coating compositions based on acid functional polyesters and epoxy resins are known from e.g. U.S. Pat. Nos. 4,094,721 and 5,262,510 and the International Patent Application WO 95/25762.

U.S. Pat. No. 4,094,721 relates to linear saturated crystalline polyesters of an acid moiety and a moiety of a dihydric alcohol, at least 40 mol percent of the acid moiety being a terephthalic acid moiety, said polyester containing moieties of 1,4-butanediol and 1,6-hexanediol, the ratio of the 1,4-butanediol moieties to 1,6-hexanediol moieties being 10:90-90:10, said polyester being further characterized by
(a) a glass transition temperature of −10° C. to +30° C.;
(b) a melting point in the range of from 40 to 130° C.;
(c) a difference between the glass transition temperature and the melting point being equal to or less than 100° C.;
(d) a reduced viscosity, measured on a 1 wt % solution in a 60–40 mixture of phenol and 1,1,2,2-tetrachloroethane of 0.5 to 1.5.

According to preferred embodiments, in addition to terephthalic acid moieties of isophthalic acid, azelaic acid, adipic acid, sebacic acid had been included, while the molar ratio of 1,4-butanediol to 1,6-hexanediol is 80:20 to 40:60 and additional dihydric alcohols could be included such as ethylene glycol, propanediol-1,3; pentanediol-1,5 and neopentyl glycol.

U.S. Pat. No. 5,262,510 disclose a process for preparing polyester resins, which comprised (1) reacting a mixture of organic carboxylic acid monomers, having at least two reactive carboxyl groups with a mixture composed of at least two aliphatic alcohols, having at least two hydroxyl groups to form a prepolymer, and (2) reacting the prepolymer with a mixture composed of pyromellitic dianhydride and adipic acid or azelaic acid to form polyester resins. Said polyester resins could be combined with epoxy resins into powder coating compositions, which could be cured at temperatures of about 160° C. in a short time of about 10 minutes, and could overcome the disadvantages of conventional mixed powder coatings, which required a high temperature (180° C.) cure.

WO 95/25762 relates to semi-crystalline polyglycidylesters obtainable by glycidation of the acid groups of a semi-crystalline acid functional polyester the latter being a reaction product of at least compound(s) A and compound(s) B, wherein compound A is a straight chain aliphatic alpha, omega-dicarboxylic acid having at least 6 carbon atoms, and wherein compound B is a straight chain aliphatic alpha, omega-primary diol having at least 4 carbon atoms, said reaction product having an acid content of from $\geq 1.6$ meq/g to $\leq 4.0$ meq/g, a number average molecular weight of at least 500, a melting temperature (Tm) by Differential Scanning Calorimetry of $\geq 25°$ C., an average acid functionality of 2 or more and essentially no reactive groups other than carboxyl groups.

A was preferably adipic-, pimelic-, suberic-, azelaic-, sebacic- or 1,10-decanedicarboxylic acid, while B was 1,4-butanediol, 1,5-pentanediol, 1,6-hexanediol, 1,7-heptanediol, 1,8-octanediol, 1,9-nonanediol, 1,10-decanediol.

However, the coated layers had to be baked at temperatures in the range of from 150 to 225° C.

On the other hand, powder coatings have become during the last decade more and more popular in the coating industry, due to the absence of solvent in the coating formulations.

This absence of solvent will become more and more important due to increasing pressure from environmental and health authorities.

However the conventional powder coating systems for indoor decorative applications have been based up to now on "hybrid" formulations, which consisted of an epoxy resin cured by an acid functional polyester. Typical curing temperatures for said systems are higher than 160° C.

It will be appreciated that there is still a growing need in powder coating formulations, which will be able to cure at temperatures lower than 140° C. in combination with other sufficiently attractive physical properties of the powder coating and of the cured coatings derived therefrom. Such compositions must be very reactive and lead to very short curing times and shall on the other hand show an acceptable storage stability under temperatures of 40° C. Moreover, said powder coating compositions will have to be applied and cured on heat sensitive substrates, such as wood and thermoplastic polymers.

In general, the resins used for powder coatings were amorphous and had therefore, a high melting viscosity. Said high melting viscosity restricted the flow of the coatings and degraded the appearance and smoothness of the films. Therefore high curing temperatures were required in order to overcome the aforementioned disadvantages.

Therefore, it is an object of the present invention to provide improved polyester resins, which can be cured at low temperatures and which, when included in powder coating compositions, cannot deteriorate the appearance of the final coating films and other relevant coating properties such as an acceptable storage stability under 40° C.

It is another object of the present invention to provide powder coating compositions containing the above polyester resins in combination with at least one epoxy resin, which can be cured at low temperatures (<140° C.), which can provide attractive coating properties and which shows an acceptable storage stability under 40° C.

It is still another object of the present invention to provide a process for the preparation of said polyester resins.

More in particular the present invention relates to linear carboxyl functional polyester resins derived from dicarboxylic acids and dialcohols, to powder coating compositions comprising said polyesters and at least one epoxy resin, and which are curable at lower temperatures than the conventional compositions and more in particular at temperatures below 140° C.

Accordingly the invention relates to linear carboxylic acid functional polyester resins, obtainable by reaction of:
(a) at least one aromatic and/or cycloaliphatic dicarboxylic acid compound A, comprising two aromatic and/or secondary aliphatic carboxyl groups in the 1,2-position, or anhydride thereof;
(b) at least one hydroxyl monocarboxylic acid $B_1$, comprising two aliphatic hydroxyl groups, which groups each independently may be primary or secondary hydroxyl groups and wherein the carboxylic acid group is a tertiary carboxyl group, mixed with a cycloaliphatic diol $B_2$, in an amount of at least 5 wt %, relative to the weight of $B_1$ and $B_2$ together;
(c) optionally an aliphatic dicarboxylic acid C, comprising an alkylene group having from 3 to 8 carbon atoms and having two terminal aliphatic carboxyl groups; and
(d) optionally an aromatic monocarboxylic acid D, the molar ratio of the compounds $A:B_1+B_2:C:D$ being $X:Y+X+Z_1:Y:Z_2$, wherein X ranges from 1 to 8, Y ranges from 0 to 8, $Z_1$ ranges from −3 to +3 and $Z_2$ ranges from 0 to 2 until at least 90% of all the hydroxyl groups as supplied into the reaction mixture have been reacted.

It will be appreciated that another aspect of the present invention is formed by a process for the preparation of the hereinbefore specified linear carboxylic acid functional polyester resins.

Accordingly the invention relates to a process for the preparation of linear carboxylic acid functional polyester resins, comprising the reaction of:
(a) at least one aromatic and/or cycloaliphatic dicarboxylic acid compound A, comprising two aromatic and/or secondary aliphatic carboxyl groups in the 1,2-position, or anhydride thereof;
(b) at least one hydroxyl monocarboxylic acid B, comprising two aliphatic hydroxyl groups, which groups each independently may be primary or secondary hydroxyl groups and wherein the carboxylic acid group is a tertiary carboxyl group;
(c) optionally an aliphatic dicarboxylic acid C, comprising an alkylene group having from 3 to 8 carbon atoms and having two terminal aliphatic carboxyl groups; and
(d) optionally an aromatic monocarboxylic acid D, the molar ratio of the compounds $A:B_1+B_2:C:D$ being $X:Y+X+Z_1:Y:Z_2$, wherein X ranges from 1 to 8, Y ranges from 0 to 8, $Z_1$ ranges from −3 to 3 and $Z_2$ ranges from 0 to 2.

This process may consist of a one step process, comprising the charging of the compounds A, $B_1$, $B_2$, C and D, simultaneously to the reactor whereafter the temperature is increased from room temperature to a reaction temperature in the range of from 100 to 200° C. and preferably from 170 to 190° C. and using a slight vacuum, preferably at a pressure in the range from 800 to 920 mbar absolute, and allowing the reaction to initiate and to proceed under continuous, optionally azeotropic, removal of water, until at least 90% of all the hydroxyl groups as supplied into the reaction mixture, have been reacted.

It will be appreciated that the aliphatic carboxyl functional polyester resins thus produced only contain tertiary carboxyl groups pendant of the main chain.

The molecular weight distribution and number average molecular weight of the produced resin will be dependent on the actual specific reactants A, $B_1$, $B_2$, C and D and on the molar ratios applied.

Typical polyester resins of the present invention have acid values in the range of from 2400 to 5500 mmol/kg and preferably from 3000 to 4200 mmol/kg.

As the tertiary aliphatic carboxyl groups present in compound $B_1$ practically do not react under the normally applied esterification conditions employed, i.e. temperatures of from 100 to 200° C. and using a slight vacuo, preferably a pressure between 800 and 920 mbar absolute, they can react later on with the epoxy groups of the epoxy resins as co-ingredient in the curable powder coating compositions.

Generally the optionally azeotropic removal of water is continued until at least 90% of all the hydroxyl groups as supplied into the reaction mixture have reacted and more preferably at least 95% of the supplied hydroxyl groups, have reacted.

An esterification catalyst known in the art of the preparation of polyesters, may be included in the reaction mixture, but is not always required. Examples of esterification catalysts are dibutyltinoxide, paratoluenesulphonic acid, tinoctoate, zincoctoate and lithium ricinoleate.

Depending on the specifically selected reactants A, $B_1$, $B_2$, C and D, it may be desired to add a small amount of a solvent e.g. xylene, toluene, which facilitates the water removal, to the specific reaction mixture involved.

Typical examples of compound A are phthalic acid, phthalic anhydride, 1,2-cyclohexane dicarboxylic acid, 1,2-cyclohexane dicarboxylic anhydride, 1,2-hexadiene dicarboxylic anhydride, 1,2-hexadiene dicarboxylic acid, or mixtures thereof. The most preferred compound A is phthalic anhydride.

A typical example of compound $B_1$ is dimethylol propionic acid.

Typical examples of compound $B_2$ are hydrogenated diphenylolpropane (HDPP) and hydrogenated diphenylol methane, of which HDPP is preferred.

Typical examples of compound C are glutaric acid, adipic acid, pimelic acid, suberic acid, azelaic acid, sebacic acid, 1,10-decane dicarboxylic acid, 1,4-cyclohexane dicarboxylic acid, of which adipic acid is preferred.

Typical examples of compound D are benzoic acid, orthotoluic acid, paratoluic acid, of which benzoic is most preferred.

It was found that those polyesters according to the present invention, wherein X ranges from 2 to 7 and Y ranges from 2 to 7 and those wherein $Z_1$ ranges from 0 to 2 and $Z_2$ ranges from 1 to 2 are preferred.

Preferably the component $B_2$ is present in an amount of at least 10 wt %, more preferably in an amount of more than 15 wt %, and most preferably in an amount of more than 30 wt % relative to the weight of $B_1$ and $B_2$ together.

It has been surprisingly found, that the most preferred powder coating compositions, showing the most attractive combinations of properties of the powder (acceptable storage stability under 40° C.) and those of the final cured coating film, can be obtained by means of a three step process.

Accordingly the invention is also relating to a process for the preparation of linear, carboxylic functional polyester resins, comprising:
(i) the reaction of (a) at least one compound A, as specified hereinbefore, with (b) at least one hereinbefore defined component $B_1$, whereby the molar amounts of A and $B_1$ are equal, at a temperature from 100 to 200° C. and preferably from 170 to 190° C., under a slight vacuum, preferably at an absolute pressure of from 800 to 920 mbar, during a period of from 2 to 8 hours, thus allowing the reaction to initiate and to proceed under continuous, optionally azeotropic, removal of water,
(ii) decreasing the temperature to 140° C. and addition of amounts of components $B_2$ and C, as specified hereinbefore, and an optional additional amount of $B_1$, and subsequent increasing of the temperature into the range of from 170 to 190° C. and after completion of the condensation reaction, proceeding under continuous optionally azeotropic, removal of water,
(iii) decreasing the temperature to 140° C. and addition of component D, as specified hereinbefore, and increasing the temperature into the range from 170 to 190° C., the reaction proceeding under continuous, optionally azeotropic removal of water, until at least 90% of all the hydroxyl groups as supplied into the reaction mixture have been reacted.

It will be appreciated that another aspect of the present invention is formed by powder coating compositions, comprising the hereinbefore specified polyester resins.

Accordingly, the invention also relates to powder coating compositions, comprising at least (i) one hereinbefore specified polyester resin according to the present invention in an amount in the range of from 20 wt % to 45 wt %, relative to the weight of the components (i) and (ii).

Depending on the finally desired coating properties, combinations of two or more of the polyester resins may be combined.

(ii) an epoxy resin, having an epoxy group content (EGC) of from 2000 mmol/kg to 1400 mmol/kg in an amount of from 60 to 80 wt %, relative to the weight of the components (i) and (ii) and preferably from 65–70 wt %.

Examples of suitable epoxy resins are:
EPIKOTE Resin 3001, 3002, 1001, 1002; EPON Resin 2002; ARALDITE GT 6071, GT 7071, GT 7072; DER 661E, 671, 662, 662E, 692 (EPIKOTE, EPON, ARALDITE and DER are trademarks).

Preferably EPIKOTE Resin 3001 is used, having an epoxy group content of from 2000 to 2200 mmol/kg and a viscosity at 25° C. in a 40% m/m MEK solution of from 6.3 to 7.9 mPa.s.

If desired said powder coating compositions may comprise in addition to the components (i) and (ii) a pigment, fillers, dye, accelerator and additives. A preferred pigment is titanium dioxide. Preferably, the pigment and/or filler is used in a pigment-filler binder weight ratio of from 0 to 0.6.

In general as accelerator can be used phosphonium and/or ammonium salts in a molar ratio from 0.02 to 0.1 of mole accelerator per mole of epoxy groups.

A preferred accelerator is butyl triphenyl phosphonium bromide. Preferably the accelerator is used in a molar ratio of from 0.03 to 0.05 mole of accelerator for 1 mole of epoxy groups.

As fillers can be used e.g. calcium carbonate, barium sulphate, kaolin.

It has been found that these powder coating compositions according to the invention allow very low curing temperatures (<120° C.), which make them very suitably for application of heat sensitive substrates.

In particular these powder coating compositions have shown very good overall properties. They have shown a very attractive appearance: high flow, high whiteness and some degree of gloss (gloss values in the range of from 35 to 90 at 60° C.) and preferably high gloss (gloss values from 70 to 90 at 60° C.).

The invention is illustrated by the following examples, however without restricting its scope to these specific examples.

EXAMPLE 1

Preparation of the Polyester I-a 2.0 Moles of benzoic acid (BA), 2.0 moles of adipic acid (AA), 7 moles of phthalic anhydride (PA), 8.0 moles of dimethylolpropionic acid (DMPA) and 2.0 moles of hydrogenated diphenylol propane (HDPP) are charged into a glass reaction flask equipped with anchor stirrer, thermometer, Dean-Stark water trap and nitrogen inlet. The temperature is increased as fast as possible to 160° C., while stirring. The walls of the reactor are thermally isolated in order to minimize sublimation of both PA and BA. When the reaction water starts to condensate (removal by distillation), the pressure in the reactor may be dropped until 850 mbar. The temperature of the reaction mixture is further raised to 185° C. and maintained until essentially all the hydroxyl functions have reacted. The advancement of the reaction is followed by the water condensate formation (about 75 to 85% of the target should be reached) and by acid group titration (at least 85% acid conversion should be reached). The polyester is then discharged into an aluminium tray and allowed to cool to room temperature.

The polyester I-a was a solid with the following properties:

| Acid group content | (mmol/kg) | 3488 |
| Acid value | (mgKOH/g) | 196 |
| Melt viscosity at 200° C. | (Poise) | <30 |

Other polyesters have been prepared following the same procedure described above, and can be found in the next table 1.

TABLE 1

| Polyester | I-a | I-b | I-c | II | III | IV | V | VI | VII | $C_1$ |
|---|---|---|---|---|---|---|---|---|---|---|
| mole PA | 7 | 7 | 7 | 5 | 5 | 5 | 6 | 7 | 7 | 11 |
| mole AA | 2 | 2 | 2 | 4 | 4 | 4 | 3 | 2 | 2 | 0 |
| mole DMPA | 8 | 8 | 8 | 9.8 | 9.6 | 9.5 | 8 | 7 | 8 | 10 |
| mole HDPP | 2 | 2 | 2 | 0.2 | 0.4 | 0.5 | 2 | 3 | 2 | 0 |
| mole BA | 2 | 2 | 2 | 2 | 2 | 2 | 2 | 2 | 0 | 0 |
| Acid group content | 3488 | 3404 | 3470 | 4150 | 4172 | 4235 | 3455 | 3030 | 3280 | 4992 |

EXAMPLE 2

Preparation of the Polyester VIII

7 Moles of phthalic anhydride (PA) and 7.0 moles of dimethylolpropionic acid (DMPA) are charged into a glass reaction flask equipped with anchor stirrer, thermometer, Dean-Stark water trap and nitrogen inlet. The temperature is increased as fast as possible to 170° C., while stirring. When the reaction water starts to condense (removal by distillation), the pressure in the reactor may be dropped until 850 mbar. After 110 minutes the internal temperature is dropped to 145° C. and when reached 2.0 moles of adipic acid (AA), 2.75 moles of dimethylolpropionic acid (DMPA) and 0.25 moles of hydrogenated diphenylol propane (HDPP) are added into the reactor. The temperature is raised to 170° C. and kept for 50 minutes under reduced pressure. After this period the temperature is reduced to 145° C. and when reached 2.0 moles of benzoic acid (BA) is added. The temperature is raised back to 170° C. and kept for 270 minutes under slight vacuum.

The advancement of the reaction is followed by the water condense formation (about 75 to 85% of the target should be reached) and by acid group titration (at least 85% acid conversion should be reached). The polyester is then discharged into an aluminium tray and allowed to cool to room temperature.

The polyester VIII is a solid with the following properties:

Acid group content (mmol/kg) 3958
Acid value (mgKOH/g) 196
Melt viscosity at 200° C. (Poise) <30
Tg (° C.) ±41° C.

Other polyesters IX and X have been prepared following the same procedure described above, and can be found in the next table 2.

TABLE 2

| Polyester | VIII | IX | X |
|---|---|---|---|
| mole PA | 7 | 7 | 7 |
| mole AA | 2 | 2 | 2 |
| mole DMPA | 9.75 | 6 | 7 |
| mole HDPP | 0.25 | 4 | 3 |
| mole BA | 2 | 2 | 2 |
| Acid group content | 13958 | 3080 | 3340 |
| Tg, ° C. | 41 | 46 | 43 |

EXAMPLE 3

Preparation of the Powder/Powder Coating and Coating Performance

A premix containing 700 g of EPIKOTE Resin 3001 (epoxy group content of 2060 mmol/kg), 413.4 g of polyester I-a (acid group content 3488 mmol/kg), 222.7 g of titanium dioxide, 23.0 g of butyltriphenylphosphonium bromide, 17.1 g of Modaflow Powder III and 8.9 g of benzoin is subsequently extruded in a co-rotating twin screw extruder at a temperature setting not exceeding 65° C. The extrudate is then cooled, crushed and milled into a fine powder, having an average particle size below 60 microns. The powder is sprayed with an electrostatic spray gun on bare steel panels and cured for 30 minutes at stoving temperatures of 100, 120 and 140° C. Final appearance properties were obtained for coating thicknesses of 50–60 microns, and were as follows at any cure temperature:

| At a stoving temperature of 100° C.: | |
|---|---|
| Gloss at 20° | 49 |
| Gloss at 60° | 88 |
| Whiteness index (ASTM E313) | 85 |
| Flow score (8 = very good - 1 = very poor) | 4 |
| At a stoving temperature of 120° C.: | |
| Gloss at 20° | 41 |
| Gloss at 60° | 84 |
| Whiteness index (ASTM E313) | 86 |
| Flow score (8 = very good - 1 = very poor) | 6 |
| Reverse impact (inch.lbs) | <20 |
| Direct impact (inch.lbs) 20 | pass |
| Erichsen slow (mm) 10 | pass |
| penetration | |
| At a stoving temperature of 140° C.: | |
| Gloss at 20° | 34 |
| Gloss at 60° | 78 |
| Whiteness index (ASTM E313) | 83 |
| Flow score (8 = very good - 1 = very poor) | 7 |
| Reverse impact (inch.lbs) | <20 |
| Direct impact (inch.lbs) 20 | pass |
| Erichsen slow (mm) 10 penetration | pass |

The other polyesters were evaluated in similar powder coating formulations, using a stoichiometric ratio of epoxy groups of the epoxy resin on acid groups of the polyesters. The coating properties obtained with the other polyesters were similar, except for the flow and gloss. The flow of the coating was better when higher quantities of AA were used. As far as the gloss was concerned, it was observed that higher quantities of HDPP could lead to higher gloss values. The following table 3 reports the gloss values obtained at 20° and at 60° for coatings based on the different polyesters, cured at 120° C. for 30 minutes.

TABLE 3

| Poly-ester | I-a | I-b | I-c | II | III | IV | V | VI | VII | VIII | IX | X | $C_1$ |
|---|---|---|---|---|---|---|---|---|---|---|---|---|---|
| Gloss 20° | 41 | 43 | 45 | 2 | 14 | 25 | 35 | 49 | 6 | 2 | 21 | 31 | 4 |
| Gloss 60° | 84 | 89 | 86 | 5 | 54 | 71 | 80 | 88 | 31 | 7 | 66 | 76 | 8 |

For polyester $C_1$, no benzoic acid was used and the resulting coating was matt instead of being glossy such as when the polyester I-a is used.

The extrudates were flattened and cooled between chilled rolls and fine milled in the jet grinding mill Alpine AFG at 1790 rpm. Powders were additionally sieved using a 100µ sieve.

All powders were applied on QD bare steel panels (ex Q-panel Company). They are made from standard low-carbon cold-rolled steel and have a bright, smooth finish.

Powders were applied by electrostatic spraying, using Gema equipment.

A flow index ranging from 0 to 8 characterises the flow of the coatings which is visually assessed. An index of 0 represents a bad flow while an index of 8 represents a high flow.

Gloss values were measured according to ASTM D523/DIN 67530, using a Byk-Mallinckrodt multi-gloss 4060 reflectometer. The apparatus was standardised at 20°, 60° and 85° with the appropriate reference panels.

Whiteness values were measured with a Hunterlab Colorquest spectrocolorimeter. The sample was illuminated at 45° and the observation was carried out under an angle of 2° according to the measurement of a whiteness index (ASTM E313).

The impact resistance of coatings was measured according to the ASTM D2794-84 method with an Erichsen variable impact tester, model 304. In this test, a standard weight is dropped from a certain height on a coated test panel. The energy of the impact is determined by the height from which the weight is dropped. The reverse and direct side of the panel are investigated to see whether the coating has failed or not. The investigation is carried out with a ten times magnifying glass. The impact tester is provided with an inch. lbs scale. This unit represents the impact energy and equals the weight multiplied by the height from which the weight is dropped. After the test, the impact on the coated side of the panel is looked at. The coating is said to have passed an impact of x inch.lbs if no damage can be spotted. The highest impact intensity which does not lead to any damage in the coating is recorded.

A slow deformation test was carried out according to the Erichsen slow penetration test. A coated panel was subjected to a gradual deformation (caused by a mechanically driven piston that advances at a constant rate of 0.2 mm.s$^{-1}$), and the minimum depth (in mm) at which the coating cracked was recorded. For the inspection of the indented coating, a 10 times magnifying glass was used.

The Gitterschnitt (GT) adhesion cross-cut test (ISO 2409-1972/ASTM D3359-1983) was performed. Coatings showing no adhesion loss were assigned a GT value of 0 whereas a 4 was given to poor adhesion results.

We claim:

1. A powder coating composition curable at a temperature of at least 120° C., comprising:
   (i) an epoxy resin having an epoxy group content (ECG) of from 2000 mmol/kg to 1400 mmol/kg; and
   (ii) a linear carboxylic acid functional polyester resin produced by reaction of:
   (a) at least one aromatic and/or cycloaliphatic dicarboxylic acid compound A, comprising two aromatic and/or secondary aliphatic carboxyl groups in the 1,2-position, or an anhydride thereof;
   (b) at least one hydroxyl monocarboxylic acid $B_1$, comprising two aliphatic hydroxyl groups, which groups each independently may be primary or secondary hydroxyl groups and wherein the carboxylic acid group is a tertiary carboxyl group, mixed with a cycloaliphatic diol $B_2$ in an amount of at least 5 wt %, relative to the weight of $B_1$ and $B_2$ together;
   (c) an aliphatic dicarboxylic acid C, comprising an alkylene group having from 3 to 8 carbon atoms and having two terminal aliphatic carboxyl groups; and
   (d) an aromatic monocarboxylic acid D selected from the group of benzoic acid, orthotoluic acid, and paratoluic acid;
   wherein the molar ratio of the compounds $A:B_1+B_2:C:D$ is $X:Y+X+Z_1:Y:Z_2$, wherein X ranges from 1 to 8, Y ranges from 1 to 8, $Z_1$ ranges from −3 to 3 and $Z_2$ ranges from 1 to 2;
   wherein at least 90% of all the hydroxyl groups supplied into the reaction mixture, have been reacted; and
   wherein a total amount of the epoxy resin and the linear carboxylic acid functional polyester resin comprises from 55 to 80 wt % of the epoxy resin and from 45 to 20 wt % of the polyester resin.

2. The powder coating composition of claim 1 wherein the polyester resin has an acid value in the range of from 2400 to 4400 mmol/kg.

3. The powder coating composition of claim 2 wherein X ranges from 2 to 7 and Y ranges from 2 to 7.

4. The powder coating composition of claim 1 wherein $Z_1$ ranges from 0 to 2 and $Z_2$ ranges from 1 to 2.

5. The powder coating composition of claim 1 wherein component A is phthalic anhydride.

6. The powder coating composition of claim 5 wherein $B_1$ is dimethylol propionic acid.

7. The powder coating composition of claim 6 wherein $B_2$ is hydrogenated diphenylol propane.

8. The powder coating composition of claim 7 wherein C is adipic acid.

9. The powder coating composition of claim 8 wherein D is benzoic acid.

10. The powder coating composition of claim 1 wherein $B_2$ is included in an amount of at least 15 wt % relative to the weight of $B_1$ and $B_2$ together.

11. A process for the preparation of linear carboxylic acid functional polyester resins, comprising:
    (a) at least one aromatic and/or cycloaliphatic dicarboxylic acid compound A, comprising two aromatic and/or secondary aliphatic carboxyl groups in the 1,2-position, or anhydride thereof;
    (b) at least one hydroxyl monocarboxylic acid B, comprising two aliphatic hydroxyl groups, which groups each independently may be primary or secondary hydroxyl groups and wherein the carboxylic acid group is a tertiary carboxyl group, and a cycloaliphatic diol $B_2$;
    (c) an aliphatic dicarboxylic acid C, comprising an alkylene group having from 3 to 8 carbon atoms and having two terminal aliphatic carboxyl groups; and
    (d) an aromatic monocarboxylic acid D selected from the group of benzoic acid, orthotoluic acid, and paratoluic acid;
    wherein the molar ratio of the compounds $A:B_1+B_2:C:D$ is $X:Y+X+Z_1:Y:Z_2$, wherein X ranges from 1 to 8, Y ranges from 1 to 8, $Z_1$ ranges from −3 to 3 and $Z_2$ ranges from 1 to 2,
    by:
    (i) reacting A with $B_1$, whereby the molar amounts of A and $B_1$ are equal at a temperature from 100 to 200° C. under a slight vacuum during a period of from 2 to 8 hours, thus allowing the reaction to initiate and proceed under continuous removal of water,
    (ii) adding $B_2$ and C, increasing the temperature from about 170 to about 190° C. and proceeding under continuous removal of water, and
    (iii) decreasing the temperature to 140° C., adding D, increasing the temperature from about 170 to about 190° C., and proceeding under continuous removal of water until at least 90% of all the hydroxyl groups supplied into the reaction mixture have been reacted.

12. The process of claim 11 wherein step (i) is carried out at a temperature from 170 to 190° C.

13. The process of claim 11 wherein step (i) is carried out at an absolute pressure of from 800 to 920 mbar.

14. A powder coating composition comprising (i) at least one polyester resin of claim 1 and (ii) an epoxy resin having an epoxy group content (EGC) of from 2000 mmol/kg to 1400 mmol/kg, wherein component (i) is present in an amount of from 20 wt % to 45 wt % relative to the weight of components (i) and (ii), and wherein component (ii) is present in an amount of from 60 to 80 wt % relative to the weight of components (i) and (ii).

15. The powder coating composition of claim 14 wherein the epoxy resin is present in an amount of from 65 to 70 wt %.

16. The powder coating composition of claim 14 wherein an epoxy resin is used having an epoxy group content of from 2000 to 2200 mmol/kg and a viscosity at 25° C. in 40% m/m methyl ethyl ketone solution in the range of from 6.3 to 7.9 mPas.

17. The powder coating composition of claim 1 wherein the polyester resin has an acid value in the range of from 3000 to 3600 mmol/kg.

18. The process of claim 11 wherein each removal of water in steps (i), (ii), and (iii) is azeotropic.

* * * * *